United States Patent
Xu et al.

(10) Patent No.: US 10,435,573 B2
(45) Date of Patent: Oct. 8, 2019

(54) BIOCOMPATIBLE INKS FOR 3D PRINTING

(71) Applicant: 3D Systems, Incorporated, Rock Hill, SC (US)

(72) Inventors: Pingyong Xu, Valencia, CA (US); John Fong, Temple City, CA (US)

(73) Assignee: 3D Systems, Inc., Rock Hill, SC (US)

(*) Notice: Subject to any disclaimer, the term of this patent is extended or adjusted under 35 U.S.C. 154(b) by 185 days.

(21) Appl. No.: 15/340,706

(22) Filed: Nov. 1, 2016

(65) Prior Publication Data

US 2017/0121542 A1 May 4, 2017

Related U.S. Application Data

(60) Provisional application No. 62/250,074, filed on Nov. 3, 2015.

(51) Int. Cl.
| | | |
|---|---|---|
| *C09D 11/101* | (2014.01) | |
| *B33Y 10/00* | (2015.01) | |
| *B29C 64/112* | (2017.01) | |
| *B33Y 50/00* | (2015.01) | |
| *B33Y 70/00* | (2015.01) | |
| *B33Y 80/00* | (2015.01) | |
| *C09D 5/00* | (2006.01) | |
| *B29K 33/00* | (2006.01) | |
| *B29K 105/00* | (2006.01) | |
| *B29L 31/00* | (2006.01) | |
| *C09D 4/00* | (2006.01) | |

(52) U.S. Cl.
CPC .......... *C09D 11/101* (2013.01); *B29C 64/112* (2017.08); *B33Y 10/00* (2014.12); *B33Y 50/00* (2014.12); *B33Y 70/00* (2014.12); *B33Y 80/00* (2014.12); *C09D 5/00* (2013.01); *B29K 2033/08* (2013.01); *B29K 2105/0032* (2013.01); *B29L 2031/753* (2013.01); *C09D 4/00* (2013.01)

(58) Field of Classification Search
CPC .......... C09D 11/101; C09D 5/00; C09D 4/00; B29C 64/112; B33Y 70/00; B33Y 80/00; B33Y 10/00; B33Y 50/00; B29L 2031/753; B29K 2033/08; B29K 2105/0032

See application file for complete search history.

(56) References Cited

U.S. PATENT DOCUMENTS

| | | | |
|---|---|---|---|
| 2005/0107509 A1* | 5/2005 | Ananthachar | ......... C08F 289/00 524/457 |
| 2005/0228062 A1* | 10/2005 | Wolf | ......... C08F 2/50 522/6 |
| 2005/0261391 A1 | 11/2005 | Narayan-Sarathy et al. | |
| 2014/0017460 A1 | 1/2014 | Xu et al. | |
| 2014/0335326 A1* | 11/2014 | Gevaert | ......... C07C 69/76 428/195.1 |
| 2015/0116415 A1 | 4/2015 | Chretien et al. | |
| 2015/0197647 A1 | 7/2015 | Birau et al. | |

FOREIGN PATENT DOCUMENTS

JP          2015061897          4/2015

OTHER PUBLICATIONS

"High Definition 3D Modeling," ProJetTM HD 3000 Technical Specifications, pp. 1-2 (Year: 2009).*
Machine English translation of JP 2015-061897, Dic Graphics Corp (Year: 2015).*
PCT International Search Report the International Searching Authority for PCT/US2016/059910, dated Feb. 2, 2017 (6 pages).
PCT Written Opinion of the International Searching Authority for PCT/US2016/059910, dated Feb. 2, 2017 (5 pages).

* cited by examiner

*Primary Examiner* — Jessica M Roswell

(57) ABSTRACT

In one aspect, inks for use with a three-dimensional printing system are described herein. In some embodiments, an ink described herein comprises 10-60 wt. % oligomeric curable material; 30-80 wt. % monomeric curable material; and 10-35 wt. % self-curable light-sensitive oligomer, based on the total weight of the ink. Moreover, in some cases, the ink is free or substantially free of non-curable photoinitiator. For example, in some instances, the ink further comprises less than 0.1 wt. % or less than 0.05 wt. % non-curable photoinitiator, based on the total weight of the ink.

13 Claims, No Drawings

BIOCOMPATIBLE INKS FOR 3D PRINTING

CROSS REFERENCE TO RELATED APPLICATIONS

This application claims priority pursuant to 35 U.S.C. § 119 to U.S. Provisional Patent Application Ser. No. 62/250,074, filed on Nov. 3, 2015, which is incorporated by reference in its entirety.

FIELD

The present invention relates to inks and, in particular, to biocompatible inks for use with three-dimensional (3D) printing systems.

BACKGROUND

Some commercially available 3D printers, such as the ProJet™ 3D Printers manufactured by 3D Systems of Rock Hill, S.C., use inks, which are also known as build materials, that are jetted through a print head as a liquid to form various 3D objects, articles, or parts. Other 3D printing systems also use an ink that is jetted through a print head or otherwise dispensed onto a substrate. In some instances, the ink is solid at ambient temperatures and converts to liquid at elevated jetting temperatures. In other instances, the ink is liquid at ambient temperatures. Moreover, in some cases, the ink can be cured following dispensing and/or deposition of the ink onto the substrate.

Other 3D printers form 3D articles from a reservoir, vat, or container of a fluid ink or build material or a powdered ink or build material. In some cases, a binder material or a laser or other source of energy is used to selectively solidify or consolidate layers of the ink or build material in a stepwise fashion to provide the 3D article.

Inks for 3D printing systems can be used to form a variety of articles for a variety of applications, including in a manner described hereinabove. However, some printed 3D articles exhibit poor biocompatibility. For instance, some such articles induce significant cytotoxicity. Some prior inks may thus be unsuitable for the formation of 3D articles for some applications, such as applications in which the articles come into contact with biological tissue.

Therefore, there exists a need for improved inks for 3D printing, including for applications requiring a high degree of biocompatibility and/or low cytotoxicity.

SUMMARY

In one aspect, inks for use with a 3D printer are described herein which, in some embodiments, may offer one or more advantages over prior inks. In some embodiments, for example, an ink described herein can be used to provide printed articles having high biocompatibility, low cytotoxicity, and/or a low amount of extractable material (or "extractables"). Such "extractables" can include unconsolidated or uncured inks or ink components that are "left over" from the 3D printing process. Thus, in some instances, an ink described herein can be used to form 3D articles for biomedical, food, and/or other consumer applications. Additionally, an ink described herein, in some cases, can provide biocompatible printed articles that also exhibit one or more desirable mechanical or thermal properties, such as high mechanical strength and/or heat resistance.

In some embodiments, an ink for use in a 3D printing system described herein comprises about 10-60 wt. % oligomeric curable material, about 30-80 wt. % monomeric curable material, and about 10-35 wt. % self-curable light-sensitive oligomer, where the weight percents are based on the total weight of the ink. Additionally, in some cases, the oligomeric curable material is present in the ink in an amount of 10-30 wt. % and the monomeric curable material is present in the ink in an amount of about 50-70 wt. %, based on the total weight of the ink. Further, in some cases, the self-curable light-sensitive oligomer is present in the ink in an amount of about 15-35 wt. % or about 20-35 wt. %, based on the total weight of the ink. Moreover, in some embodiments, an ink described herein comprises less than about 0.5 wt. % or less than about 0.01 wt. % non-curable photoinitiator, based on the total weight of the ink. In addition, in some instances, an ink described herein further comprises one or more additives selected from the group consisting of colorants, inhibitors, and stabilizing agents.

Moreover, in some embodiments, the oligomeric curable material of an ink described herein comprises a urethane (meth)acrylate oligomer, a polyester (meth)acrylate, an epoxy (meth)acrylate oligomer, or a combination thereof. The monomeric curable material, in some cases, comprises a monofunctional (meth)acrylate, a difunctional (meth)acrylate, a trifunctional (meth)acrylate, a tetrafunctional (meth)acrylate, a pentafunctional (meth)acrylate, or a combination thereof. In addition, in some instances, the self-curable light-sensitive oligomer comprises one or more ethyleneically unsaturated moieties.

In another aspect, methods of printing a 3D article are described herein. In some cases, a method of printing a 3D article described herein is a jetting method, such as a "multi-jet modeling" (MJM) method. In some such instances, the method comprises selectively depositing layers of an ink described herein in a fluid state onto a substrate. Further, the layers of the ink can be deposited according to an image of the 3D article in a computer readable format. Additionally, a method described herein can further comprise curing the layers of the ink.

A method of printing a 3D article described herein can also be a "stereolithography" (SLA) method. For instance, in some embodiments, a method of printing a 3D article described herein comprises retaining an ink described herein in a fluid state in a container, and selectively applying energy to the ink in the container to solidify at least a portion of a first fluid layer of the ink, thereby forming a first solidified layer that defines a first cross-section of the article. Such a method can further comprise raising or lowering the first solidified layer to provide a second fluid layer of the ink at a surface of the fluid ink in the container, and then selectively applying energy to the ink in the container to solidify at least a portion of the second fluid layer of the ink, thereby forming a second solidified layer that defines a second cross-section of the article. In such cases, the first cross-section and the second cross-section can be bonded to one another in a z-direction.

In still another aspect, printed 3D articles are described herein. Such 3D articles can be formed from an ink described herein and/or using a method described herein. Additionally, such 3D articles can exhibit high biocompatibility, low cytotoxicity, and low extractables.

These and other embodiments are described in greater detail in the detailed description which follows.

DETAILED DESCRIPTION

Embodiments described herein can be understood more readily by reference to the following detailed description and examples. Elements, apparatus and methods described herein, however, are not limited to the specific embodiments presented in the detailed description and examples. It should be recognized that these embodiments are merely illustrative of the principles of the present disclosure. Numerous modifications and adaptations will be readily apparent to those of skill in the art without departing from the spirit and scope of the disclosure.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

The terms "three-dimensional printing system," "three-dimensional printer," "printing," and the like generally describe various solid freeform fabrication techniques for making three-dimensional articles or objects by stereolithography, selective deposition, jetting, fused deposition modeling, multi-jet modeling, and other additive manufacturing techniques now known in the art or that may be known in the future that use a build material or ink to fabricate three-dimensional objects.

I. Inks for 3D Printing

In one aspect, inks for use with a 3D printer are described herein. In some embodiments, an ink described herein comprises an oligomeric curable material, a monomeric curable material, and a self-curable light-sensitive oligomer. Additionally, an ink described herein, in some cases, further comprises a colorant, such as a molecular dye, a particulate inorganic pigment, or a particulate organic colorant. An ink described herein may also comprise one or more additives selected from the group consisting of inhibitors and stabilizing agents. Moreover, in some instances, an ink described herein is free or substantially free of non-curable photoinitiator.

Turning now to specific components of inks, inks described herein comprise oligomeric and monomeric curable materials. A curable material, for reference purposes herein, comprises a chemical species that includes one or more curable or polymerizable moieties. A "polymerizable moiety," for reference purposes herein, comprises a moiety that can be polymerized or cured to provide a printed 3D article or object. Such polymerizing or curing can be carried out in any manner not inconsistent with the objectives of the present disclosure. In some embodiments, for example, polymerizing or curing comprises irradiating a polymerizable or curable material with electromagnetic radiation having sufficient energy to initiate a polymerization or cross-linking reaction. For instance, in some cases, ultraviolet (UV) radiation can be used. Thus, in some instances, a polymerizable moiety comprises a photo-polymerizable or photo-curable moiety, such as a UV-polymerizable moiety. In some embodiments, a curable material described herein is photo-polymerizable or photo-curable at wavelengths ranging from about 300 nm to about 400 nm or from about 320 nm to about 380 nm. Alternatively, in other instances, a curable material is photo-polymerizable at visible wavelengths of the electromagnetic spectrum.

Moreover, a polymerization reaction, in some cases, comprises a free radical polymerization reaction, such as that between points of unsaturation, including points of ethyleneic unsaturation. Other polymerization reactions may also be used. As understood by one of ordinary skill in the art, a polymerization reaction used to polymerize or cure a curable material described herein can comprise a reaction of a plurality of "monomers" or chemical species having one or more functional groups or moieties that can react with one another to form one or more covalent bonds.

One non-limiting example of a polymerizable moiety of a curable material described herein is an ethyleneically unsaturated moiety, such as a vinyl moiety, allyl moiety, or (meth)acrylate moiety, where the term "(meth)acrylate" includes acrylate or methacrylate or a mixture or combination thereof.

Additionally, a curable material described herein can be a monofunctional, difunctional, trifunctional, tetrafunctional, pentafunctional, or higher functional curable material. A "monofunctional" curable material, for reference purposes herein, comprises a chemical species that includes one curable or polymerizable moiety. Similarly, a "difunctional" curable material comprises a chemical species that includes two curable or polymerizable moieties; a "trifunctional" curable material comprises a chemical species that includes three curable or polymerizable moieties; a "tetrafunctional" curable material comprises a chemical species that includes four curable or polymerizable moieties; and a "pentafunctional" curable material comprises a chemical species that includes five curable or polymerizable moieties. Thus, in some embodiments, a monofunctional curable material of an ink described herein comprises a mono(meth)acrylate, a difunctional curable material of an ink described herein comprises a di(meth)acrylate, a trifunctional curable material of an ink described herein comprises a tri(meth)acrylate, a tetrafunctional curable material of an ink described herein comprises a tetra(meth)acrylate, and a pentafunctional curable material of an ink described herein comprises a penta(meth)acrylate. Other monofunctional, difunctional, trifunctional, tetrafunctional, and pentafunctional curable materials may also be used.

Moreover, a monofunctional, difunctional, trifunctional, tetrafunctional, and pentafunctional curable material, in some cases, can comprise a relatively low molecular weight species or a relatively high molecular weight species. For example, a curable material can comprise or be either a "monomeric" or molecular species (i.e., a species that is itself not a polymer or oligomer, that is a relatively low molecular weight species, or that is a relatively low viscosity species), or an "oligomeric" species (i.e., a species that is itself a polymer or oligomer, that is a relatively high molecular weight species, or that is a relatively high viscosity species) that is capable of undergoing additional polymerization, such as through one or more points of unsaturation described herein. Thus, in some cases, a population of "monomeric" or molecular species in a curable material can have a consistent or well-defined molecular structure and/or formula throughout the population (such as may be exhibited, for instance, by a specified mass of ethoxylated (4) bisphenol A diacrylate). In contrast, a population of "oligomeric" species in a curable material can have a varying molecular structure and/or formula throughout the population (such as may be exhibited, for example, by a specified mass of a urethane acrylate having a non-unity molecular weight distribution, or by a specified mass of an ethoxylated polyethylene glycol having a distribution of ethylene glycol units and/or a distribution of ethoxy units within the population). Further, the weight average molecular weight of an "oligomeric" curable material can generally be in the range from about 400 to 10,000, from about 600 to 10,000, or from about 500 to 7,000. The molecular weight of a "monomeric" curable material, in contrast, can generally be below 600, below 500, below 400, below 300, below 200, or below 100. Additionally, in some embodiments, a "monomeric" curable material has a viscosity of 500 centipoise (cP) or less at 25° C., when measured according to ASTM D2983, while an "oligomeric" curable material has a viscosity of 1000 cP or more at 25° C., when measured according to ASTM D2983.

In general, any monomeric curable materials not inconsistent with the objectives of the present disclosure may be used. In some cases, the monomeric curable material of an ink described herein comprises one or more species of (meth)acrylates, such as one or more monofunctional, difunctional, trifunctional, tetrafunctional (meth)acrylates, and/or pentafunctional (meth)acrylates. In some embodiments, for instance, a monomeric curable material comprises methyl (meth)acrylate, ethyl (meth)acrylate, n-propyl (meth)acrylate, n-butyl (meth)acrylate, isobutyl (meth)acrylate, n-hexyl (meth)acrylate, 2-ethylhexyl (meth)acrylate, n-octyl (meth)acrylate, n-decyl (meth)acrylate, n-dodecyl (meth)acrylate, 2-hydroxyethyl (meth)acrylate, 2- or 3-hydroxypropyl (meth)acrylate, 2-methoxyethyl (meth)acrylate, 2-ethoxyethyl (meth)acrylate, 2- or 3-ethoxypropyl (meth)acrylate, tetrahydrofurfuryl methacrylate, isobornyl (meth)acrylate, 2-(2-ethoxyethoxy)ethyl acrylate, cyclohexyl methacrylate, 2-phenoxyethyl acrylate, glycidyl acrylate, isodecyl acrylate, 2-phenoxyethyl (meth)acrylate, lauryl methacrylate, or a combination thereof. In some embodiments, a monomeric curable material comprises one or more of allyl acrylate, allyl methacrylate, triethylene glycol di(meth)acrylate, tricyclodecane dimethanol diacrylate, and cyclohexane dimethanol diacrylate. Additionally, in some cases, a monomeric curable material comprises diacrylate and/or dimethacrylate esters of aliphatic, cycloaliphatic or aromatic diols, including 1,3- or 1,4-butanediol, neopentyl glycol, 1,6-hexanediol, diethylene glycol, triethylene glycol, tetraethylene glycol, tripropylene glycol, 1,4-dihydroxymethylcyclohexane, 2,2-bis(4-hydroxycyclohexyl)propane or bis(4-hydroxycyclohexyl)methane, hydroquinone, 4,4'-dihydroxybiphenyl, bisphenol A, bisphenol F, or bisphenol S. A monomeric curable material described herein may also comprise 1,1-trimethylolpropane tri(meth)acrylate, pentaerythritol monohydroxy tri(meth)acrylate, dipentaerythritol monohydroxy penta(meth)acrylate, and/or bis(trimethylolpropane) tetra(meth)acrylate. Further, in some cases, a monomeric curable material can comprise an ethoxylated or propoxylated species, such as ethoxylated or propoxylated neopentyl glycol, ethoxylated or propoxylated bisphenol A, ethoxylated or propoxylated bisphenol F, ethoxylated or propoxylated bisphenol S, ethoxylated or propoxylated 1,1,1-trimethylolpropanetri(meth)acrylate, or ethoxylated or propoxylated glycerol tri(meth)acrylate.

Additional non-limiting examples of commercially available monomeric curable materials useful in some embodiments described herein include the following: isobornyl acrylate (IBOA), commercially available from SARTOMER under the trade name SR 506; isobornyl methacrylate, commercially available from SARTOMER under the trade name SR 423A; triethylene glycol diacrylate, commercially available from SARTOMER under the trade name SR 272; triethylene glycol dimethacrylate, commercially available from SARTOMER under the trade name SR 205; tricyclodecane dimethanol diacrylate, commercially available from SARTOMER under the trade name SR 833S; tris(2-hydroxy ethyl)isocyanurate triacrylate, commercially available from SARTOMER under the trade name SR 368; 2-phenoxyethyl acrylate, commercially available from SARTOMER under the trade name SR 339; ethyoxylated (3 mole) bisphenol A diacrylate, commercially available from SARTOMER under the trade name SR 349; and dipentaerythritol pentaacrylate, commercially available from SARTOMER under the trade name SR 399 LV. Other commercially available monomeric curable materials may also be used.

A monomeric curable material can be present in an ink described herein in any amount not inconsistent with the objectives of the present disclosure. In some cases, the monomeric curable material, in total, is present in an amount up to about 80 wt. %, up to about 70 wt. %, up to about 60 wt. %, or up to about 50 wt. %, based on the total weight of the ink. In some cases, an ink described herein comprises about 30-80 wt. % monomeric curable material, based on the total weight of the ink. In some embodiments, an ink comprises about 30-70 wt. %, 30-75 wt. %, 30-60 wt. %, 40-80 wt. %, 40-75 wt. %, 40-70 wt. %, 40-60 wt. %, 45-80 wt. %, 50-80 wt. %, 50-75 wt. %, 50-70 wt. %, or 60-80 wt. % monomeric curable material, based on the total weight of the ink.

In addition, any oligomeric curable material not inconsistent with the objectives of the present disclosure may be used in an ink described herein. In some cases, for instance, an oligomeric curable material comprises a polyester (meth)acrylate oligomer, a urethane (meth)acrylate oligomer, or an epoxy(meth)acrylate oligomer. Further, in some embodiments, an oligomeric curable material described herein comprises an aliphatic polyester urethane acrylate oligomer and/or an acrylate amine oligomeric resin, such as EBECRYL 7100. In some cases, an oligomeric curable material described herein comprises a polypropylene glycol mono (meth)acrylate or polyethylene glycol mono(meth)acrylate. In some embodiments, an oligomeric curable material comprises a monofunctional aliphatic urethane (meth)acrylate. Moreover, in some cases, an oligomeric curable material comprises a diacrylate and/or dimethacrylate ester of an aliphatic, cycloaliphatic or aromatic diol, including polyethylene glycol, ethoxylated or propoxylated neopentyl glycol, ethoxylated or propoxylated bisphenol A, ethoxylated or propoxylated bisphenol F, ethoxylated or propoxylated bisphenol S, ethoxylated or propoxylated 1,1,1-trimethylolpropanetri(meth)acrylate, or ethoxylated or propoxylated glycerol tri(meth)acrylate.

Some non-limiting examples of commercially available oligomeric curable materials useful in some embodiments described herein include the following: alkoxylated tetrahydrofurfuryl acrylate, commercially available from SARTOMER under the trade name SR 611; monofunctional urethane acrylate, commercially available from RAHN USA under the trade name GENOMER 1122; and aliphatic urethane diacrylate, commercially available from ALLNEX under the trade name EBECRYL 8402. Other commercially available oligomeric curable materials may also be used.

Urethane (meth)acrylates suitable for use in inks described herein, in some cases, can be prepared in a known manner, typically by reacting a hydroxyl-terminated urethane with acrylic acid or methacrylic acid to give the corresponding urethane (meth)acrylate, or by reacting an isocyanate-terminated prepolymer with hydroxyalkyl acrylates or methacrylates to give the urethane (meth)acrylate. Suitable processes are disclosed, inter alia, in EP-A 114 982 and EP-A 133 908. The weight average molecular weight of such (meth)acrylate oligomers, in some cases, can be from about 400 to 10,000 or from about 500 to 7,000. Urethane (meth)acrylates are also commercially available from SARTOMER under the product names CN980, CN981, CN975 and CN2901, or from BOMAR Specialties Co. under the product name BR-741. In some embodiments described herein, a urethane (meth)acrylate oligomer has a viscosity ranging from about 140,000 centipoise (cP) to about 160,000 cP at about 50° C. or from about 125,000 cP to about 175,000 cP at about 50° C. when measured in a manner consistent with ASTM D2983. In some cases, a urethane (meth)acrylate oligomer has a viscosity ranging from about 100,000 cP to about 200,000 cP at about 50° C. or from about 10,000 cP to about 300,000 cP at about 50° C. when measured in a manner consistent with ASTM D2983.

An oligomeric curable material can be present in an ink described herein in any amount not inconsistent with the objectives of the present disclosure. In some cases, oligomeric curable material, in total, is present in the ink in an amount up to about 60 wt. %, up to about 50 wt. %, up to about 40 wt. %, up to about 30 wt. %, or up to about 20 wt. %, based on the total weight of the ink. In some instances, an ink described herein comprises about 10-60 wt. % oligomeric curable material, based on the total weight of the ink. In some embodiments, an ink comprises about 10-50 wt. %, 10-40 wt. %, 10-30 wt. %, 10-20 wt. %, 15-40 wt. %, 15-30 wt. %, 20-60 wt. %, 20-50 wt. %, 20-40 wt. %, 30-60 wt. %, 30-50 wt. %, or 40-60 wt. % oligomeric curable material, based on the total weight of the ink.

In addition, it is to be understood that the ratio of oligomeric curable material to monomeric curable material in an ink described herein can be selected to provide an ink having a viscosity suitable for use in a desired 3D printing system, such as a 3D printing system using a piezoelectric print head to dispense inks, or a stereolithography 3D printing system, as described further herein.

Inks described herein also comprise a self-curable light-sensitive oligomer. It is to be understood that the self-curable light-sensitive oligomer of inks described herein differs from the oligomeric curable material of the inks, and that the two components are different components of the inks. Any self-curable light-sensitive oligomer not inconsistent with the objectives of the present disclosure may be used in an ink described herein. In addition, such an "oligomer" may or may not be formed from a plurality of repeating units. Instead, as described above, it is to be understood that the "oligomer" can be a relatively high molecular weight species, such as a species having a molecular weight greater than 400, greater than 500, or greater than 700. In some cases, the self-curable light-sensitive oligomer of an ink described herein has a weight average molecular weight of about 400 to 10,000, about 400 to 5000, about 400 to 2000, about 400 to 1000, about 500 to 10,000, about 500 to 5000, about 500 to 2000, about 500 to 1000, about 700 to 2000, or about 700 to 1500.

Further, it is to be understood that a "self-curable" light-sensitive oligomer comprise one or more curable moieties. A "curable moiety" of a self-curable oligomer, for reference purposes herein, comprises a moiety that can be polymerized, cured, or reacted with a polymerizable moiety of a monomeric or oligomeric curable material of the ink, including in a manner described hereinabove for monomeric and oligomeric curable materials. For example, in some embodiments, the self-curable light-sensitive oligomer comprises one or more ethyleneically unsaturated moieties, such as one or more (meth)acrylate moieties.

Additionally, it is further to be understood that a self-curable oligomer that is "light-sensitive" can be polymerized or cured in response to the presence of light or electromagnetic radiation, including light or electromagnetic radiation of a specific wavelength. For example, in some cases, a self-curable light-sensitive oligomer polymerizes or cures when exposed to UV light, such as UV light having a wavelength of 320-380 nm, 340-370 nm, or 350-360 nm. Thus, in such instances, the self-curable light-sensitive oligomer can be a photoinitiator of the ink at a range of wavelengths recited above. Moreover, in some embodiments, a self-curable light-sensitive oligomer of an ink described herein does not polymerize or cure, or substantially polymerize or cure, when exposed to light having an average or peak wavelength of less than 300 nm. A self-curable light-sensitive oligomer that does not "substantially" polymerize or cure when exposed to light having a specified wavelength, in some cases, undergoes less than 10%, less than 5%, or less than 1% polymerization when exposed to the light for up to 10 seconds, up to 5 seconds, or up to 1 second. Thus, in such instances, the self-curable light-sensitive photoinitiator is not a photoinitiator of the ink at curing wavelengths below 300 nm.

Further, in some cases, a self-curable light-sensitive oligomer of an ink described herein comprises one or more moieties or chemical bonds that can be removed, cleaved, and/or otherwise transformed by exposure to initiating light, such as UV light, in a manner that generates a free radical species. Such a moiety, for reference purpose herein, can be referred to as a "light-sensitive" or "labile" moiety. Moreover, such a free radical species generated from such a labile moiety can serve as a photoinitiator for polymerization or curing of the self-curable light-sensitive oligomer and/or for polymerization or curing of the monomeric and/or oligomeric curable material of the ink.

In some embodiments, a self-curable light-sensitive oligomer described herein comprises a monofunctional or multifunctional (meth)acrylate oligomer having one or more labile moieties. The one or more labile moieties, in some cases, comprise a ketone moiety, such as an aryl ketone or alkyl aryl ketone moiety. Moreover, in some instances, a labile moiety of the oligomer and a (meth)acrylate moiety of the oligomer are located on opposing ends of the oligomer. For example, in some embodiments, the labile moiety and the (meth)acrylate moiety have an α,ω spatial relationship. Additionally, in some cases, the labile moiety and the (meth)acrylate moiety are separated by a hydrophobic moiety, such as a hydrophobic moiety comprising a C6-C30, C6-C20, or C10-C20 alkyl or aryl moiety, which may be substituted or unsubstituted and/or branched or linear. It is to be understood that a Cn moiety is a moiety having "n" carbon atoms. In some instances, a self-curable light-sensitive oligomer comprises a urethane (meth)acrylate comprising one or more labile moieties on a first end or terminus of the urethane (meth)acrylate, and one or more (meth)acrylate moieties on a second end or terminus of the urethane (meth)acrylate. In some embodiments, a self-curable light-sensitive oligomer comprises a radiation-curable overprint varnish described in U.S. Patent Application Publication 2005/0261391 to Narayan-Sarathy et al., or in U.S. Pat. No. 7,504,441 to Narayan-Sarathy et al. Additional non-limiting examples of self-curable light-sensitive oligomers suitable for use in some embodiments of inks described herein include FLEXCURE resins from ASHLAND (such as FLEXCURE OPV 120, OPV 130, and OPV 140) and LEO materials from EBERCRYL (such as LEO 10101 and LEO 10102).

A self-curable light-sensitive oligomer described herein can be present in an ink in any amount not inconsistent with the objectives of the present disclosure. In some cases, for example, self-curable light-sensitive oligomer is present in the ink in an amount of up to about 40 wt. %, up to about 35 wt. %, up to about 30 wt. %, or up to about 20 wt. %, based on the total weight of the ink. In some embodiments, the self-curable light-sensitive oligomer is present in the ink in an amount of about 10-40 wt. %, 10-35 wt. %, 10-30 wt. %, 15-35 wt. %, 15-30 wt. %, 20-40 wt. %, or 20-35 wt. %, based on the total weight of the ink.

An ink described herein can also comprise a colorant. The colorant of an ink described herein can be a particulate colorant, such as a particulate pigment, or a molecular colorant, such as a molecular dye. Any such particulate or molecular colorant not inconsistent with the objectives of the present disclosure may be used. In some cases, for instance, the colorant of an ink comprises an inorganic pigment, such as $TiO_2$ and/or $ZnO$. In some embodiments, the colorant of an ink comprises a colorant for use in a RGB, sRGB, CMY, CMYK, L*a*b*, or Pantone® colorization scheme. In some instances, one or more colorants of an ink described herein exhibits a white color. In other cases, a colorant exhibits a black color. Some non-limiting examples of colorants suitable for use in some embodiments described herein include SUN UVDJ107, SUN UVDJ150, SUN UVDJ322, SUN UVDJ350, SUN UVDJ354, RJA D3010-FX-Y150, RJA D3410-FX-Y150, RJA D3410-FX-K, PENN COLOR 9B898, and PENN COLOR 9B989. Moreover, in some cases, a particulate colorant described herein has an average particle size of less than about 5 μm, or less than about 1 μm. In some instances, a particulate colorant described herein has an average particle size of less than about 500 nm, such as an average particle size of less than about 400 nm, less than about 300 nm, less than about 250 nm, less than about 200 nm, or less than about 150 nm. In some instances, a particulate colorant has an average particle size of about 50-5000 nm, about 50-1000 nm, or about 50-500 nm.

A colorant can be present in an ink described herein in any amount not inconsistent with the objectives of the present disclosure. In some cases, colorant is present in the ink in an amount up to about 2 wt. %, or an amount of about 0.005-2 wt. %, 0.01-2 wt. %, 0.01-1.5 wt. %, 0.01-1 wt. %, 0.01-0.5 wt. %, 0.1-2 wt. %, 0.1-1 wt. %, 0.1-0.5 wt. %, or 0.5-1.5 wt. %, based on the total weight of the ink.

Moreover, inks described herein, in some embodiments, further comprise one or more other additives. In some cases, for example, an ink described herein further comprises one or more polymerization inhibitors and/or stabilizing agents. A polymerization inhibitor can be added to an ink to provide additional thermal stability to the composition. Any polymerization inhibitor not inconsistent with the objectives of the present disclosure may be used. Moreover, a polymerization inhibitor can retard or decrease the rate of polymerization, and/or prevent polymerization from occurring for some period of time or "induction time" until the polymerization inhibitor is consumed. Further, in some cases, a polymerization inhibitor described herein is an "addition type" inhibitor. An inhibitor described herein can also be a "chain transfer type" inhibitor. In some instances, a suitable polymerization inhibitor comprises methoxyhydroquinone (MEHQ).

A stabilizing agent, in some embodiments, comprises one or more anti-oxidants. A stabilizing agent can comprise any anti-oxidant not inconsistent with the objectives of the present disclosure. In some cases, suitable anti-oxidants include various aryl compounds, including butylated hydroxytoluene (BHT), which can also be used as a polymerization inhibitor in some embodiments described herein. More generally, a single species may serve as both a stabilizing agent and a polymerization inhibitor. It is also possible, in some cases, to use a plurality of inhibitors and/or stabilizing agents, wherein differing inhibitors and/or stabilizers provide differing effects and/or work synergistically.

A polymerization inhibitor and/or a stabilizing agent can be present in an ink in any amount not inconsistent with the objectives of the present disclosure. In some embodiments, a polymerization inhibitor is present in an amount ranging from about 0.01 wt. % to about 2 wt. % or from about 0.05 wt. % to about 1 wt. %. Similarly, in some cases, a stabilizing agent is present in an ink in an amount ranging from about 0.1 wt. % to about 5 wt. %, from about 0.5 wt. % to about 4 wt. %, or from about 1 wt. % to about 3 wt. %, based on the total weight of the ink.

Additionally, in some cases, an ink described herein is further characterized by components that are not included in the ink, or that are included in only small amounts. For instance, in some embodiments, an ink described herein is free or substantially free of non-curable photoinitiators. An ink that is "substantially" free of non-curable photoinitiator, or from which non-curable photoinitiator has been "substantially" excluded, as used herein, can comprise less than about 1 wt. %, less than about 0.5 wt. %, less than about 0.1 wt. %, less than about 0.07 wt. %, less than about 0.05 wt. %, or less than about 0.01 wt. % non-curable photoinitiator, based on the total weight of the ink. Thus, in some cases, an ink described herein comprises 0-0.5 wt. %, 0-0.1 wt. %, 0-0.07 wt. %, 0-0.05 wt. %, or 0-0.01 wt. % non-curable photoinitiator, based on the total weight of the ink. Moreover, a "non-curable" photoinitiator, as used herein, can include any photoinitiator that does not include a moiety that can be polymerized or cured with the curable materials of the ink, such as an ethyleneically unsaturated moiety. For instance, in some cases, a non-curable photoinitiator does not comprise a (meth)acrylate moiety.

In some embodiments, such an excluded or substantially excluded non-curable photoinitiator comprises an alpha-cleavage type (unimolecular decomposition process) photoinitiator or a hydrogen abstraction photosensitizer-tertiary amine synergist, operable to absorb light between about 250 nm and about 400 nm or between about 300 nm and about 385 nm, to yield free radical(s). Examples of alpha cleavage photoinitiators are Irgacure 184 (CAS 947-19-3), Irgacure 369 (CAS 119313-12-1), and Irgacure 819 (CAS 162881-26-7). An example of a photosensitizer-amine combination is Darocur BP (CAS 119-61-9) with diethylaminoethylmethacrylate.

In addition, in some instances, non-curable photoinitiators that are excluded or substantially excluded from an ink described herein comprise benzoins, including benzoin, benzoin ethers, such as benzoin methyl ether, benzoin ethyl ether and benzoin isopropyl ether, benzoin phenyl ether and benzoin acetate, acetophenones, including acetophenone, 2,2-dimethoxyacetophenone and 1,1-dichloroacetophenone, benzil, benzil ketals, such as benzil dimethyl ketal and benzil diethyl ketal, anthraquinones, including 2-methylanthraquinone, 2-ethylanthraquinone, 2-tert-butylanthraquinone, 1-chloroanthraquinone and 2-amylanthraquinone, triphenylphosphine, benzoylphosphine oxides, such as 2,4,6- trimethylbenzoyldiphenylphosphine oxide (Lucirin TPO), benzophenones, such as benzophenone and 4,4'-bis(N,N'-dimethylamino)benzophenone, thioxanthones and xanthones, acridine derivatives, phenazine derivatives, quinoxaline derivatives or 1-phenyl-1,2-propanedione, 2-O-benzoyl oxime, 1-aminophenyl ketones or 1-hydroxyphenyl ketones, such as 1-hydroxycyclohexyl phenyl ketone, phenyl 1-hydroxyisopropyl ketone and 4-isopropylphenyl 1-hydroxyisopropyl ketone.

Excluded or substantially excluded non-curable photoinitiators can also comprise photoinitiators operable for use with a HeCd laser radiation source, including acetophenones, 2,2-dialkoxybenzophenones and 1-hydroxyphenyl ketones, such as 1-hydroxycyclohexyl phenyl ketone or 2-hydroxyisopropyl phenyl ketone (=2-hydroxy-2,2-dimethylacetophenone). Additionally, in some cases, excluded or substantially excluded photoinitiators comprise photoinitiators operable for use with an Ar laser radiation source including benzil ketals, such as benzil dimethyl ketal. In some embodiments, an excluded or substantially excluded photoinitiator comprises an α-hydroxyphenyl ketone, benzil dimethyl ketal or 2,4,6-trimethylbenzoyldiphenylphosphine oxide or a mixture thereof.

Another class of non-curable photoinitiator that may be excluded or substantially excluded from an ink described herein comprises ionic dye-counter ion compounds capable of absorbing actinic radiation and generating free radicals for polymerization initiation. Some ionic dye-counter ion compounds and their mode of operation are disclosed in EP-A-0 223 587 and U.S. Pat. Nos. 4,751,102; 4,772,530; and 4,772,541.

Similarly, in some embodiments, an ink described herein is free or substantially free of one or more sensitizers. In general, a sensitizer can be added to an ink to increase the effectiveness of one or more photoinitiators that may also be present. An ink described herein that is "substantially" free of sensitizer, or from which sensitizer has been "substantially" excluded, as used herein, can comprise less than about 0.5 wt. %, less than about 0.1 wt. %, less than about 0.07 wt. %, less than about 0.05 wt. %, or less than about 0.01 wt. % sensitizer, based on the total weight of the ink. In some cases, an excluded or substantially excluded sensitizer comprises isopropylthioxanthone (ITX) or 2-chlorothioxanthone (CTX).

Additionally, in some embodiments, an ink described herein is free or substantially free of non-curable components more generally, in addition to being free or substantially free of non-curable photoinitiators and/or sensitizers. Excluding any non-curable colorants, polymerization inhibitors, or stabilizers that may be present, an ink described herein, in some cases, comprises less than about 1 wt. %, less than about 0.5 wt. %, or less than about 0.1 wt. % non-curable components, based on the total weight of the ink.

For instance, in some embodiments, an ink described herein can be free or substantially free of non-curable viscosity modifying agents, where a "non-curable" viscosity modifying agent is free or substantially free of a moiety that can be polymerized or cured with the curable materials of the ink. In some cases, for instance, a non-curable viscosity modifying agent is free or substantially free of an ethylenically unsaturated moiety such as a (meth)acrylate moiety. A viscosity modifying agent that is "substantially" free of a moiety, as used herein, can comprise less than about 10 mol. % or less than about 5 mol. % of the moiety, based on the total amount of the viscosity modifying agent. Similarly, an ink that is "substantially" free of a non-curable viscosity modifying agent, as used herein, can comprise less than about 5 wt. %, less than about 3 wt. %, less than about 1 wt. %, less than about 0.5 wt. %, or less than about 0.1 wt. % non-curable viscosity modifying agent, based on the total weight of the ink. Non-limiting examples of a non-curable viscosity modifying agent that may be excluded or substantially excluded from an ink described herein include a saturated fatty acid or a combination of saturated fatty acids, or an oil, such as a plant oil.

Inks described herein can exhibit a variety of desirable properties. For example, an ink described herein can have any freezing point, melting point, and/or other phase transition temperature not inconsistent with the objectives of the present disclosure. In some cases, an ink has freezing and melting points consistent with temperatures used in some 3D printing systems, including 3D printing systems designed for use with phase changing inks. In some embodiments, the freezing point of an ink is greater than about 40° C. In some instances, for example, an ink has a freezing point centered at a temperature ranging from about 45° C. to about 55° C. or from about 50° C. to about 80° C. In some cases, an ink has a freezing point below about 40° C. or below about 30° C.

Further, in some embodiments described herein, an ink exhibits a sharp freezing point or other phase transition. In some cases, for instance, an ink freezes over a narrow range of temperatures, such as a range of about 1-10° C., about 1-8° C., or about 1-5° C. In some embodiments, an ink having a sharp freezing point freezes over a temperature range of X±2.5° C., where X is the temperature at which the freezing point is centered (e.g., X=65° C.).

In addition, an ink described herein, in some cases, is fluid at jetting temperatures encountered in some 3D printing systems. Moreover, in some embodiments, an ink solidifies once deposited on a surface during the fabrication of a three-dimensionally printed article or object. Alternatively, in other instances, an ink remains substantially fluid upon deposition on a surface. Solidification of an ink, in some embodiments, occurs through a phase change of the ink or a component of the ink. The phase change can comprise a liquid to solid phase change or a liquid to semi-solid phase change. Further, in some instances, solidification of an ink comprises an increase in viscosity of the ink, such as an increase in viscosity from a low viscosity state to a high viscosity state. Solidification of an ink can also occur due to curing of the ink.

Additionally, in some embodiments, an ink described herein, when non-cured, has a viscosity profile consistent with the requirements and parameters of one or more 3D printing systems, such as a multi-jet modeling or stereolithography system. In some cases, for example, an ink described herein has a dynamic viscosity ranging from about 8.0 cP to about 14.0 cP or from about 9.0 to about 14.0 cP at a jetting temperature of the system, such as a temperature of about 80° C., when measured according to ASTM standard D2983 (e.g., using a Brookfield Model DV-II+ Viscometer). In some embodiments, an ink has a dynamic viscosity of about 9.5-12.5 cP or about 10.5-12.5 cP at a temperature of about 80° C. In some cases, an ink has a viscosity of about 8.0-10.0 cP at a temperature of about 85-87° C. In some embodiments, an ink described herein has a dynamic viscosity of about 8.0-19.0 cP, about 8.0-13.5 cP, about 11.0-14.0 cP, about 11.5-13.5 cP, or about 12.0-13.0 cP at a temperature of about 65° C., when measured according to ASTM D2983. In other instances, an ink described herein when non-cured exhibits a dynamic viscosity of about 200-2000 cP, about 200-900 cP, about 300-900 cP, about 300-800 cP, about 400-1000 cP, about 400-900 cP, about 400-800 cP, about 400-600 cP, about 450-550 cP, about 500-700 cP, about 500-600 cP, or about 500-550 cP at 30° C., when measured according to ASTM D2983. In some cases, an ink described herein when non-cured exhibits a dynamic viscosity of less than about 100 cP or more than about 1000 cP, when measured according to ASTM D2983.

Further, inks described herein, in some embodiments, can exhibit a combination of one or more desirable features. In some cases, for instance, an ink in the non-cured state has one or more of the following properties:

1. Freezing point below about 30° C., below about 25° C., or below about 15° C.;
2. Viscosity of about 9-14 cP at 70-95° C. or about 400-1000 cP at 25-35° C.; and
3. Thermal stability for at least 6 months at room temperature (25° C.).

As described above, viscosity can be measured according to ASTM D2983 (e.g., using a Brookfield Model DV-II+ Viscometer). In addition, for reference purposes herein, a "thermally stable" material exhibits no greater than about a 35 percent change in viscosity over a specified time period (e.g., 3 days) when measured at the specified temperature (e.g., room temperature) at the beginning and at the end of the time period. In some embodiments, the viscosity change is no greater than about 30 percent or no greater than about 20 percent, based on the larger viscosity value. In some cases, the viscosity change is between about 10 percent and about 20 percent or between about 25 percent and about 30 percent. Moreover, in some embodiments, the change in viscosity is an increase in viscosity.

Inks described herein can also exhibit a variety of desirable properties, in addition to those described hereinabove, in a cured state. An ink in a "cured" state, as used herein, comprises an ink that includes a curable material or polymerizable component that has been at least partially polymerized and/or cross-linked. For instance, in some cases, a cured ink is at least about 10% polymerized or cross-linked or at least about 30% polymerized or cross-linked. In some embodiments, a cured ink is at least about 50%, at least about 70%, at least about 80%, or at least about 90% polymerized or cross-linked. In some instances, a cured ink is between about 10% and about 99% polymerized or cross-linked.

In some cases, an ink described herein, when cured, has an elongation at break of about 10-30%, about 10-40%, about 10-20%, or about 15-30%, when measured according to ASTM D638. Further, a cured ink described herein, in some cases, can have a tensile strength of about 3500-7000 psi or about 4000-6000 psi, when measured according to ASTM D638. Additionally, a cured ink described herein, in some embodiments, can have a tensile modulus of about 100-400 ksi or about 150-300 ksi, when measured according to ASTM D638.

An ink described herein can also exhibit high biocompatibility and/or low cytotoxicity. For instance, in some cases, an ink described herein, when cured, exhibits a cytotoxicity grade below 2 when measured according to ANSI/AAMI/ISO 10993-5:2009 as described hereinbelow. In some embodiments, an ink described herein, when cured, exhibits a cytotoxicity grade of 0 or 1 when measured according to ANSI/AAMI/ISO 10993-5:2009.

Moreover, in some cases, an ink described herein, when cured, can exhibit a plurality of the foregoing properties. For example, in some embodiments, an ink when cured has a tensile strength of about 4000-6000 psi when measured according to ASTM D638; a tensile modulus of about 150-300 ksi when measured according to ASTM D638; an elongation at break of about 10-20% when measured according to ASTM D638; and a cytotoxicity grade of 0 or 1 when measured according to ANSI/AAMI/ISO 10993-5:2009.

Inks described herein can be produced in any manner not inconsistent with the objectives of the present disclosure. In some embodiments, for instance, a method for the preparation of an ink described herein comprises the steps of mixing the components of the ink, melting the mixture, and filtering the molten mixture. Melting the mixture, in some cases, is carried out at a temperature of about 75° C. or in a range from about 75° C. to about 85° C. In some embodiments, an ink described herein is produced by placing all components of the ink in a reaction vessel and heating the resulting mixture to a temperature ranging from about 75° C. to about 85° C. with stirring. The heating and stirring are continued until the mixture attains a substantially homogenized molten state. In general, the molten mixture can be filtered while in a flowable state to remove any large undesirable particles that may interfere with jetting or extrusion or other printing process. The filtered mixture can then be cooled to ambient temperatures and stored until ready for use in a 3D printing system.

II. Methods of Printing a 3D Article

In another aspect, methods of printing a 3D article or object are described herein. Methods of printing a 3D article or object described herein can include forming the 3D article from a plurality of layers of an ink described herein in a layer-by-layer manner. Any ink described hereinabove in Section I may be used. For example, in some cases, the ink comprises 10-60 wt. % oligomeric curable material, 30-80 wt. % monomeric curable material, and 10-35 wt. % self-curable light-sensitive oligomer, based on the total weight of the ink. Moreover, in some instances, the ink is free or substantially free of non-curable photoinitiator. Further, the layers of an ink can be deposited according to an image of the 3D article in a computer readable format. In some embodiments, the ink is deposited according to preselected computer aided design (CAD) parameters. Moreover, in some cases, one or more layers of an ink described herein has a thickness of about 10 µm to about 100 µm, about 10 µm to about 80 µm, about 10 µm to about 50 µm, about 20 µm to about 100 µm, about 20 µm to about 80 µm, or about 20 µm to about 40 µm. Other thicknesses are also possible.

Additionally, it is to be understood that methods of printing a 3D article described herein can include so-called multi-jet modeling or stereolithography 3D printing methods. For example, in some instances, a multi-jet method of printing a 3D article comprises selectively depositing layers of an ink described herein in a fluid state onto a substrate, such as a build pad of a 3D printing system. In addition, in some embodiments, a method described herein further comprises supporting at least one of the layers of the ink with a support material. Any support material not inconsistent with the objectives of the present disclosure may be used.

A method described herein can also comprise curing the layers of the ink. For example, in some instances, a method of printing a 3D article described herein further comprises subjecting the ink to electromagnetic radiation of sufficient wavelength and intensity to cure the ink, where curing can comprise polymerizing one or more polymerizable moieties or functional groups of one or more components of the ink. In some cases, a layer of deposited ink is cured prior to the deposition of another or adjacent layer of ink. Additionally, curing one or more layers of deposited ink, in some embodiments, is carried out by exposing the one or more layers to electromagnetic radiation, such as UV light. Moreover, in some cases, the UV light has an average wavelength of 320-380 nm, 340-370 nm, or 350-360 nm. Further, in some instances, the UV light does not have an average wavelength of less than 300 nm.

Further, in some embodiments, a preselected amount of ink described herein is heated to the appropriate temperature and jetted through the print head or a plurality of print heads of a suitable inkjet printer to form a layer on a print pad in a print chamber. In some cases, each layer of ink is deposited according to the preselected CAD parameters. A suitable print head to deposit the ink, in some embodiments, is a piezoelectric print head. Additional suitable print heads for the deposition of ink and support material described herein are commercially available from a variety of ink jet printing apparatus manufacturers. For example, Xerox, Hewlett Packard, or Ricoh print heads may be used in some instances.

Additionally, in some embodiments, an ink described herein remains substantially fluid upon deposition. Alternatively, in other instances, the ink exhibits a phase change upon deposition and/or solidifies upon deposition. Moreover, in some cases, the temperature of the printing environment can be controlled so that the jetted droplets of ink solidify on contact with the receiving surface. In other embodiments, the jetted droplets of ink do not solidify on contact with the receiving surface, remaining in a substantially fluid state. Additionally, in some instances, after each layer is deposited, the deposited material is planarized and cured with electromagnetic (e.g., UV) radiation prior to the deposition of the next layer. Optionally, several layers can be deposited before planarization and curing, or multiple layers can be deposited and cured followed by one or more layers being deposited and then planarized without curing. Planarization corrects the thickness of one or more layers prior to curing the material by evening the dispensed material to remove excess material and create a uniformly smooth exposed or flat up-facing surface on the support platform of the printer. In some embodiments, planarization is accomplished with a wiper device, such as a roller, which may be counter-rotating in one or more printing directions but not counter-rotating in one or more other printing directions. In some cases, the wiper device comprises a roller and a wiper that removes excess material from the roller. Further, in some instances, the wiper device is heated. It should be noted that the consistency of the jetted ink described herein prior to curing, in some embodiments, should desirably be sufficient to retain its shape and not be subject to excessive viscous drag from the planarizer.

Moreover, a support material, when used, can be deposited in a manner consistent with that described hereinabove for the ink. The support material, for example, can be deposited according to the preselected CAD parameters such that the support material is adjacent or continuous with one or more layers of the ink. Jetted droplets of the support material, in some embodiments, solidify or freeze on contact with the receiving surface. In some cases, the deposited support material is also subjected to planarization.

Layered deposition of the ink and support material can be repeated until the 3D article has been formed. In some embodiments, a method of printing a 3D article further comprises removing the support material from the ink.

It is also possible to form a 3D article from an ink described herein using stereolithography (SLA). For example, in some cases, a method of printing a 3D article comprises retaining an ink described herein in a fluid state in a container and selectively applying energy to the ink in the container to solidify at least a portion of a fluid layer of the ink, thereby forming a solidified layer that defines a cross-section of the 3D article. Additionally, a method described herein can further comprise raising or lowering the solidified layer of ink to provide a new or second fluid layer of unsolidified ink at the surface of the fluid ink in the container, followed by again selectively applying energy to the ink in the container to solidify at least a portion of the new or second fluid layer of the ink to form a second solidified layer that defines a second cross-section of the 3D article. Further, the first and second cross-sections of the 3D article can be bonded or adhered to one another in the z-direction (or build direction corresponding to the direction of raising or lowering recited above) by the application of the energy for solidifying the ink. Moreover, selectively applying energy to the ink in the container can comprise applying electromagnetic radiation, such as UV radiation, having a sufficient energy to cure the ink. In some instances, the UV light has an average wavelength of 320-380 nm, 340-370 nm, or 350-360 nm. Further, in some embodiments, the UV light does not have an average wavelength of less than 300 nm. In some cases, the curing radiation is provided by a computer controlled laser beam. In addition, in some cases, raising or lowering a solidified layer of ink is carried out using an elevator platform disposed in the container of fluid ink. A method described herein can also comprise planarizing a new layer of fluid ink provided by raising or lowering an elevator platform. Such planarization can be carried out, in some cases, by a wiper or roller.

It is further to be understood that the foregoing process can be repeated a desired number of times to provide the 3D article. For example, in some cases, this process can be repeated "n" number of times, wherein n can be up to about 100,000, up to about 50,000, up to about 10,000, up to about 5000, up to about 1000, or up to about 500. Thus, in some embodiments, a method of printing a 3D article described herein can comprise selectively applying energy to an ink in a container to solidify at least a portion of an nth fluid layer of the ink, thereby forming an nth solidified layer that defines an nth cross-section of the 3D article, raising or lowering the nth solidified layer of ink to provide an (n+1)th layer of unsolidified ink at the surface of the fluid ink in the container, selectively applying energy to the (n+1)th layer of ink in the container to solidify at least a portion of the (n+1)th layer of the ink to form an (n+1)th solidified layer that defines an (n+1)th cross-section of the 3D article, raising or lowering the (n+1)th solidified layer of ink to provide an (n+2)th layer of unsolidified ink at the surface of the fluid ink in the container, and continuing to repeat the foregoing steps to form the 3D article. Further, it is to be understood that one or more steps of a method described herein, such as a step of selectively applying energy to a layer of ink, can be carried out according to an image of the 3D article in a computer-readable format. General methods of 3D printing using stereolithography are further described, inter alia, in U.S. Pat. Nos. 5,904,889 and 6,558,606.

Performing a printing process described above can provide a printed 3D article from an ink described herein that has a high feature resolution. The "feature resolution" of an article, for reference purposes herein, can be the smallest controllable physical feature size of the article. The feature resolution of an article can be described in terms of a unit of distance such as microns (µm), or in terms of dots per inch (dpi). As understood by one of ordinary skill in the art, a higher feature resolution corresponds to a higher dpi value but a lower distance value in µm. In some cases, an article formed by depositing or solidifying an ink described herein can have a feature resolution of about 500 µm or less, about 200 µm or less, about 100 µm or less, or about 50 µm or less, including at elevated temperatures. In some embodiments, an article has a feature resolution between about 50 µm and about 500 µm, between about 50 µm and about 200 µm, between about 50 µm and about 100 µm, or between about 100 µm and about 200 µm. Correspondingly, in some instances, an article described herein has a feature resolution of at least about 100 dpi, at least about 200 dpi, at least about 250 dpi, at least about 400 dpi, or at least about 500 dpi. In some cases, the feature resolution of an article is between about 100 dpi and about 600 dpi, between about 100 dpi and about 250 dpi, or between about 200 dpi and about 600 dpi.

III. Printed 3D Articles

In another aspect, printed 3D articles are described herein. In some embodiments, a printed 3D article is formed from an ink described herein. Any ink described hereinabove in Section I may be used. For example, in some cases, the ink comprises 10-60 wt. % oligomeric curable material, 30-80 wt. % monomeric curable material, and 10-35 wt. % self-curable light-sensitive oligomer, based on the total weight of the ink. Moreover, in some instances, the ink is free or substantially free of non-curable photoinitiator. As described further herein, a printed 3D article formed from such an ink, when cured, can exhibit high biocompatibility and/or low cytotoxicity. For example, such a printed 3D article can exhibit a cytotoxicity grade of 0 or 1 when measured in accordance with ANSI/AAMI/ISO 10993-5:2009 as described below. Thus, printed 3D articles described herein, in some cases, can be used for various biomedical, food, and/or consumer applications.

Some embodiments described herein are further illustrated in the following non-limiting examples.

Examples

Inks according to some embodiments described herein were prepared as follows. Specifically, to prepare various inks, the components of Table I were mixed in a reaction vessel. The amounts in Table I refer to the wt. % of each component of the identified ink, based on the total weight of the ink. For each ink, the appropriate mixture was heated to a temperature of about 75-85° C. with stirring. The heating and stirring were continued until the mixture attained a substantially homogenized molten state. The molten mixture was then filtered. Next, the filtered mixture was allowed to cool to ambient temperature.

For Ink 1, the monomeric curable material ("Monomeric Curable Material" in Table I) was a mixture of SR 272, IBOA, and SR 833S. For Ink 2, the monomeric curable material was a mixture of SR 272, SR 506, SR 833S, SR 349, and SR 399 LV. The oligomeric curable material ("Oligomeric Curable Material" in Table I) for all inks was BR 741. The self-curable light-sensitive oligomer ("Self-Curable Oligomer" in Table I) for all inks was LEO 10101. The stabilizer ("Stabilizer" In Table I) was BHT for all inks.

Various mechanical/physical properties of Ink 1 are provided in Table II. The elongation, tensile strength, and tensile modulus values in Table II were measured according to ASTM D638. Dogbone test specimens were formed using an MJM 3D printing system. Curing was carried out using a PHOSEON FE 300 UV light source (365 nm, 8V).

The biocompatibility of Ink 1 and Ink 2 (and of printed articles formed therefrom) was evaluated in accordance with ANSI/AAMI/ISO 10993-5:2009. Specifically, a cytotoxity/elution test/MEM extract evaluation was performed on test articles consisting of square-shaped, cured printed articles formed using a MJM 3D printing system (Ink 1) or an SLA 3D printing system (Ink 2).

Preparation of Cell Cultures:

Multiple cultures of L-929 (ATCC cell line CCL 1, NCTC clone 929) mouse fibroblast cells were prepared using a 5% serum supplemented cell culture medium and incubated at $37\pm1°$ C. in a humidified incubator with $5\pm1\%$ $CO_2$. The cell cultures were plated 24-48 hours prior to applying the extract medium in order to allow for a cell monolayer with greater than 80% confluence to form.

Test Article Preparation and Extraction:

Each test article was cut into smaller pieces and placed in a sterile glass container. Extraction medium was added and each test article was completely immersed. Control articles were also prepared in the same manner. Before extraction, the solutions appeared clear and free of particulates. The test articles and corresponding control solutions were incubated for $24\pm2$ hours at $37\pm1°$ C. and extracted with agitation. Specifically, one piece of the test article was used in the extraction for each trial. For the Ink 1 samples, the total surface area for one piece was 121.5 $cm^2$. The extraction ratio was 60 $cm^2$/20 mL (the article thickness was equal to or greater than 0.05 cm), yielding a total volume extracted of 40.5 mL. For the Ink 2 samples, the total surface area for one piece was 57.7 $cm^2$. The extraction ratio was 60 $cm^2$/20 mL (the article thickness was equal to or greater than 0.05 cm), yielding a total volume extracted of 19.2 mL. The extraction medium was Minimum Essential Medium (MEM). The MEM was a 5% serum supplemented cell culture medium comprised of 93% Single Strength Minimum Essential Medium with Earle's salts (1XMEM), 5% Horse Serum, 1% 10,000 units/mL Penicillin-Streptomycin, and 1% 250 µg/mL Fungizone (Amphotericin B solubilized).

The positive, negative, and reagent controls were prepared and extracted in a similar manner. For the positive control for both Ink 1 and Ink 2, the total surface area for one piece was 28.5 $cm^2$. The extraction ratio was 60 $cm^2$/20 mL, yielding a total volume extracted of 9.5 mL. For the negative control for Ink 1, the total surface area for one piece was 34.6 $cm^2$. For the negative control for Ink 2, the total surface area for one piece was 33.3 $cm^2$. The extraction ratio was 60 $cm^2$/20 mL, yielding a total volume extracted of 11.5 mL (for Ink 1) and 11.1 mL (for Ink 2). For the reagent control for both Ink 1 and Ink 2, the total volume extracted was 20 mL.

Test Procedure:

Following the $24\pm2$ hours extraction period, each extractant was visually inspected. There were no observed changes in color or clarity and no particulate matter was present. The test article and control extracts were administered to the cells within 24 hours after the completion of the extraction process. The extracts were used undiluted, unfiltered, and were not manipulated in any way prior to dosing.

The growth medium from triplicate 10 cm² wells, each containing a monolayer of L-929 Mouse Fibroblast Cells (ATCC Cell Line CCL1, NCTC Clone 929), was decanted and replaced with 2 mL of 1× Dulbecco's PBS to rinse away any debris. The PBS was then decanted and replaced with 2 mL of the test article extract. The control extracts were administered in the same manner as the test article extract. All cell cultures were incubated for 48±2 hours at 37±1° C. in a humidified incubator with 5±1% $CO_2$.

The cells in all of the culture wells were examined under an inverted light microscope with 100× magnification after a minimum of 24 hours and 48±2 hours following dose administration.

Results:

For "scoring" or "grading" purposes, the conditions of cell cultures were graded according to criteria in Table III below. The average score or grade for the three test wells at the 48-hour point was used to determine the cytotoxic response. The average score for the controls at the 48-hour point was used to compare results. A numerical grade higher than 2 (mild reactivity) is considered a cytotoxic effect. Results are provided in Table IV below. In Table IV below, the positive, negative, and reagent results are presented only once. These results were the same for both the Ink 1 experiments and the Ink 2 experiments. In addition, all results were the same in triplicate.

For the Ink 1 samples, cells treated with the test article extract exhibited a response of grade 0 (no reactivity) at 24 and 48 hours. Cells treated with the negative and reagent control extracts each exhibited a response of grade 0 (no reactivity) at 24 hours and 48 hours. Cells treated with positive control extract exhibited a response of grade 4 (severe reactivity) at 24 and 48 hours. The test was considered valid because the test system reacted to the positive and negative controls as expected. Based on qualitative evaluation of the cells exposed to the test article extract, the test article was not considered to have a cytotoxic effect (no reactivity).

For the Ink 2 samples, cells treated with the test article extract exhibited a response of grade 0 (no reactivity) at 24 hours and a response of grade 1 (slight reactivity) at 48 hours. Cells treated with the negative and reagent control extracts each exhibited a response of grade 0 (no reactivity) at 24 hours and 48 hours. Cells treated with positive control extract exhibited a response of grade 4 (severe reactivity) at 24 and 48 hours. The test was considered valid because the test system reacted to the positive and negative controls as expected. Based on qualitative evaluation of the cells exposed to the test article extract, the test article was not considered to have a cytotoxic effect (slight reactivity).

TABLE I

Ink Components.

| | Oligomeric Curable Material | Monomeric Curable Material | Self-Curable Oligomer | Stabilizer |
|---|---|---|---|---|
| Ink 1 | 17.6 | 62.7 | 19.6 | 0.08 |
| Ink 2 | 17.5 | 62.5 | 20 | 0.02 |

TABLE II

Ink Properties: Mechanical/Physical.

| | Elongation (%) | Tensile Strength (psi) | Tensile Modulus (ksi) |
|---|---|---|---|
| Ink 1 | 14.34 | 5147 | 218 |

TABLE III

Ink Properties: Biocompatibility Criteria.

| Cytotoxicity Grade | Reactivity | Conditions of all Cultures |
|---|---|---|
| 0 | None | Discrete intracytoplasmatic granules, no cell lysis, no reduction of cell growth. |
| 1 | Slight | Not more than 20% of the cells are round, loosely attached and without intracytoplasmatic granules, or show changes in morphology; occasional lysed cells are present; only slight growth inhibition observable. |
| 2 | Mild | Not more than 50% of the cells are round, devoid of intracytoplasmatic granules, no extensive cell lysis; not more than 50% growth inhibition observable. |
| 3 | Moderate | Not more than 70% of the cell layers contain rounded cells or are lysed; cell layers not completely destroyed, but more than 50% growth inhibition observable. |
| 4 | Severe | Nearly complete or complete destruction of the cell layers. |

TABLE IV

Ink Properties: Biocompatibility.

| | Reactivity 24 h | Grade 24 h | Reactivity 48 h | Grade 48 h |
|---|---|---|---|---|
| Ink 1 Test Article | None | 0 | None | 0 |
| Ink 2 Test Article | None | 0 | Slight | 1 |
| Positive Control | Severe | 4 | Severe | 4 |
| Negative Control | None | 0 | None | 0 |
| Reagent Control | None | 0 | None | 0 |

In addition to Inks 1 and 2 above, other inks are provided using the amounts in Table V below. The amounts in Table V refer to the wt. % of each component of the identified ink, based on the total weight of the ink

TABLE V

Ink Components.

| Oligomeric Curable Material | Monomeric Curable Material | Self-Curable Oligomer | Stabilizer | Colorant | Non-Curable Photo-initiator |
|---|---|---|---|---|---|
| 10-60 | 30-80 | 10-35 | 0.01-1 | 0-2 | 0 |
| 10-50 | 50-80 | 10-35 | 0.1-2 | 0.1-2 | 0 |
| 10-40 | 40-70 | 15-35 | 0.01-2 | 0.1-1 | 0 |
| 10-30 | 60-80 | 15-30 | 0.01-0.2 | 0-0.5 | 0 |
| 15-60 | 60-70 | 15-25 | 0.01-0.1 | 0.1-1.5 | 0-0.01 |
| 15-50 | 50-70 | 20-35 | 0.01-0.5 | 0-2 | 0-0.01 |
| 15-40 | 40-80 | 20-35 | 0.01-1 | 0-1.5 | 0-0.05 |
| 15-30 | 50-70 | 20-30 | 0.05-1.5 | 0.01-1 | 0-0.05 |
| 20-60 | 40-80 | 15-35 | 0.01-2 | 0-0.5 | 0 |
| 20-50 | 40-80 | 15-35 | 0.01-0.2 | 0.5-1.5 | 0-0.01 |

All patent documents referred to herein are incorporated by reference in their entireties. Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

That which is claimed:

1. A method of printing a three-dimensional article comprising:
    selectively depositing layers of an ink in a fluid state onto a substrate,
    wherein the ink comprises
        10-60 wt. % oligomeric curable material;
        30-80 wt. % monomeric curable material; and
        10-35 wt. % self-curable light-sensitive oligomer, based on the total weight of the ink,
    wherein the ink comprises 0-0.01 wt. % non-curable photoinitiator, based on the total weight of the ink.

2. The method of claim 1, wherein the layers of the ink are deposited according to an image of the three-dimensional article in a computer readable format.

3. The method of claim 1 further comprising curing the layers of the ink with UV light having an average wavelength of 340-370 nm.

4. A method of printing a three-dimensional article comprising:
    retaining an ink in a fluid state in a container;
    selectively applying energy to the ink in the container to solidify at least a portion of a first fluid layer of the ink, thereby forming a first solidified layer that defines a first cross-section of the article;
    raising or lowering the first solidified layer to provide a second fluid layer of the ink at a surface of the fluid ink in the container; and
    selectively applying energy to the ink in the container to solidify at least a portion of the second fluid layer of the ink, thereby forming a second solidified layer that defines a second cross-section of the article, the first cross-section and the second cross-section being bonded to one another in a z-direction,
    wherein the ink comprises
        10-60 wt. % oligomeric curable material;
        30-80 wt. % monomeric curable material; and
        10-35 wt. % self-curable light-sensitive oligomer, based on the total weight of the ink,
    wherein the ink comprises 0-0.01 wt. % non-curable photoinitiator, based on the total weight of the ink.

5. The method of claim 1, wherein the oligomeric curable material is present in the ink in an amount of 10-30 wt. %, based on the total weight of the ink.

6. The method of claim 1, wherein the monomeric curable material is present in the ink in an amount of 40-70 wt. %, based on the total weight of the ink.

7. The method of claim 1, wherein the self-curable light-sensitive oligomer is present in the ink in an amount of 20-35 wt. %, based on the total weight of the ink.

8. The method of claim 1, wherein:
    the oligomeric curable material is present in the ink in an amount of 10-30 wt. %;
    the monomeric curable material is present in the ink in an amount of 40-70 wt. %; and
    the self-curable light-sensitive oligomer is present in the ink in an amount of 20-35 wt. %, based on the total weight of the ink.

9. The method of claim 1, wherein:
    the oligomeric curable material comprises a urethane (meth)acrylate oligomer, a polyester (meth)acrylate oligomer, an epoxy (meth)acrylate oligomer, or a combination thereof; and
    the monomeric curable material comprises a monofunctional (meth)acrylate, a difunctional (meth)acrylate, a trifunctional (meth)acrylate, a tetrafunctional (meth)acrylate, a pentafunctional (meth)acrylate, or a combination thereof.

10. The method of claim 1, wherein the self-curable light-sensitive oligomer is a photoinitiator of the ink at 340-370 nm.

11. The method of claim 1, wherein the self-curable light-sensitive oligomer comprises one or more ethylenically unsaturated moieties.

12. The method of claim 1, wherein the ink further comprises one or more additives selected from the group consisting of inhibitors and stabilizing agents.

13. The method of claim 1, wherein the ink when cured has a cytotoxicity grade below 2 when measured according to ANSI/AAMI/ISO 10993-5:2009.

* * * * *